Feb. 2, 1943.  W. W. MASON  2,309,856
SAFETY DEVICE FOR PRESSURE VESSELS AND THE LIKE
Filed March 11, 1940  3 Sheets-Sheet 2
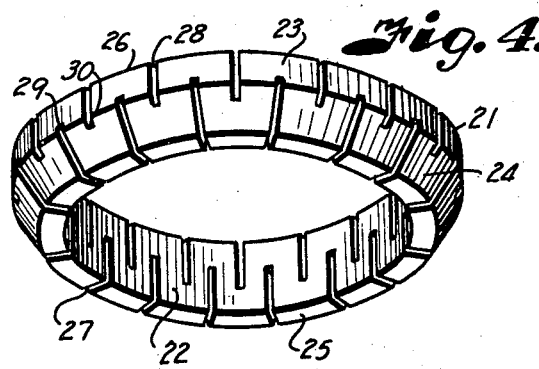
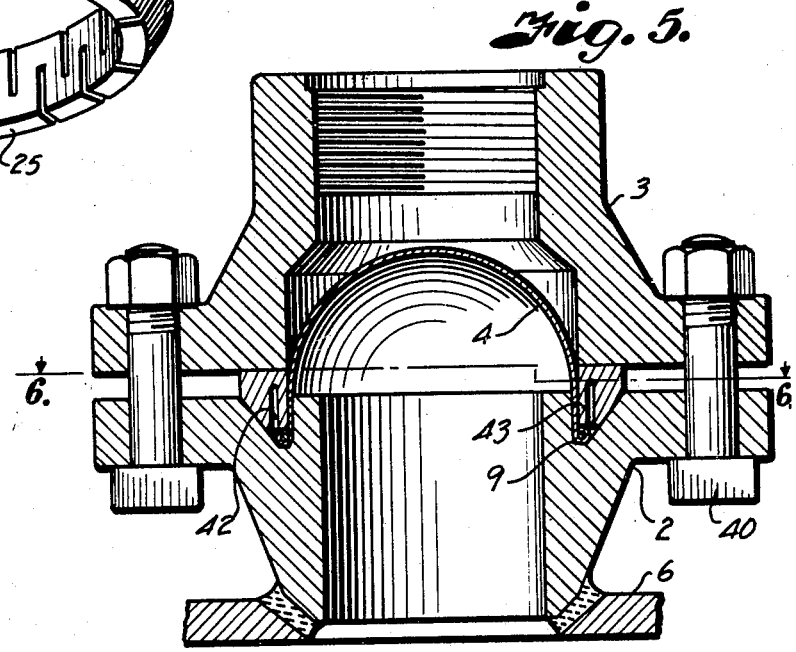
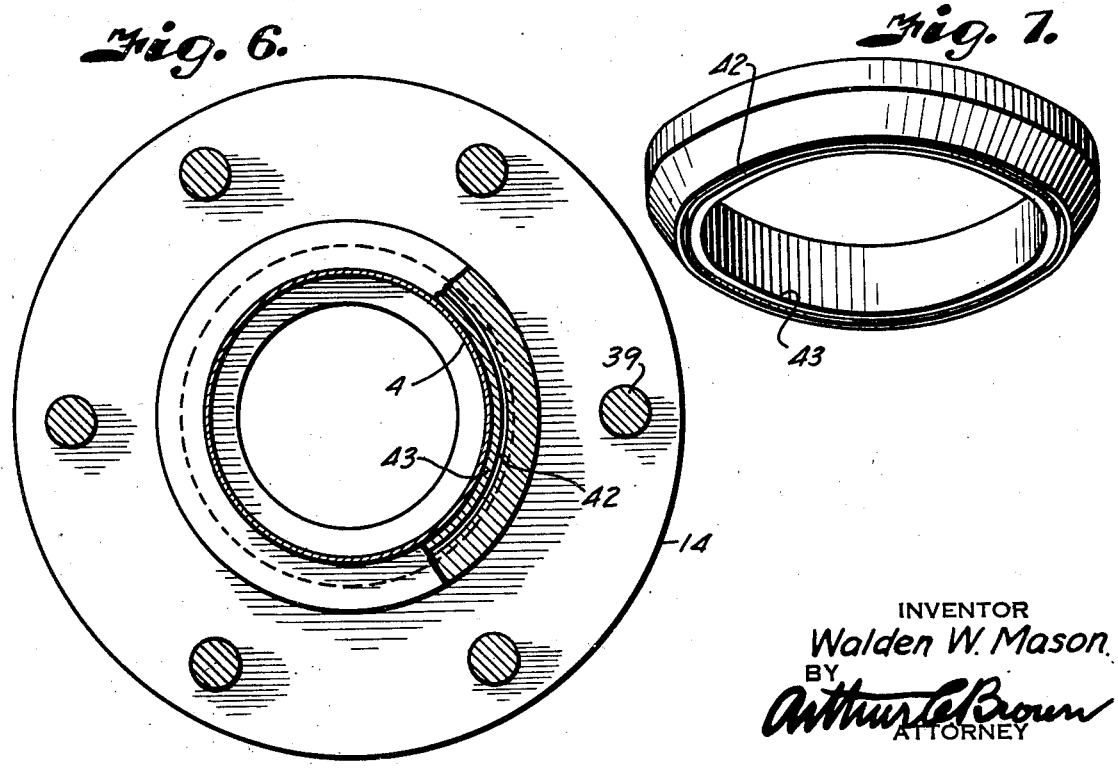
INVENTOR
Walden W. Mason.
BY
Arthur L. Brown
ATTORNEY

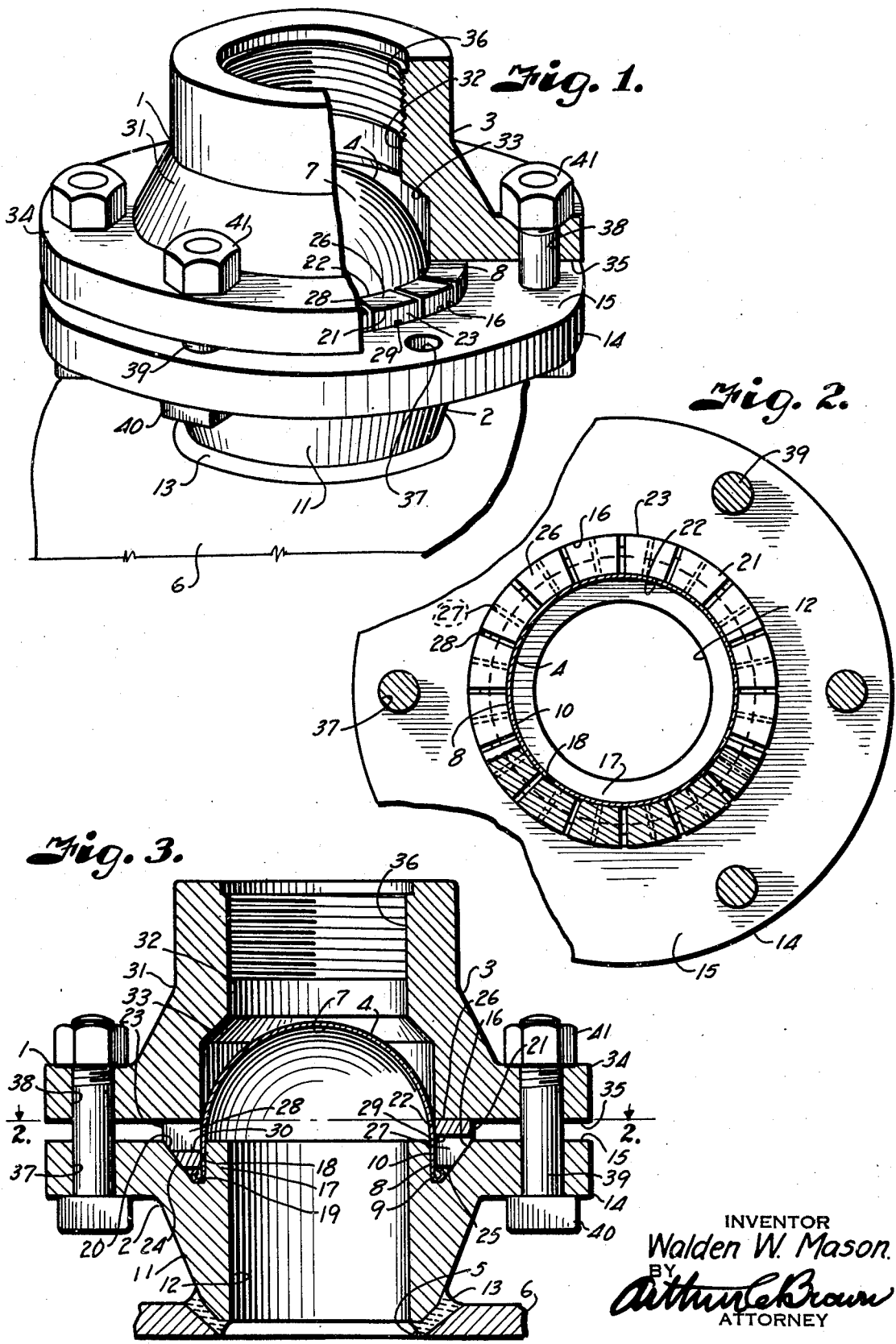

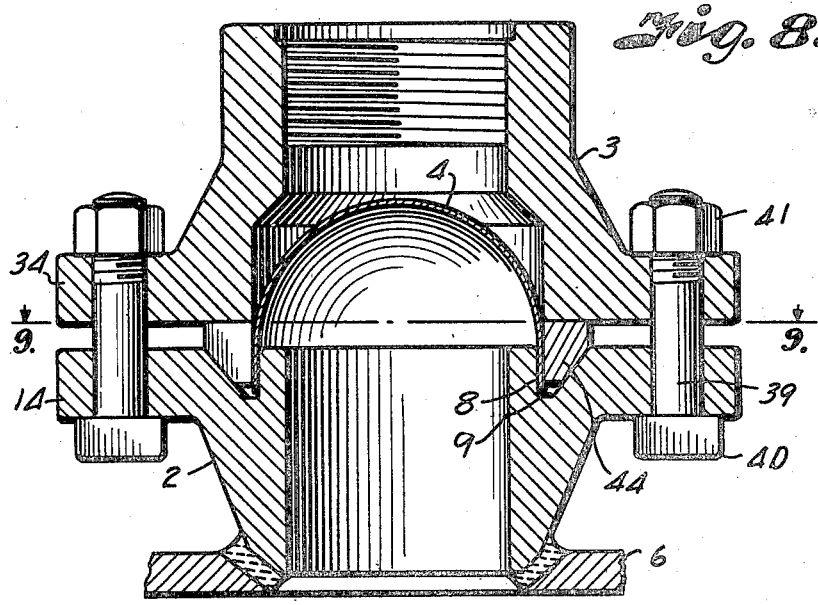
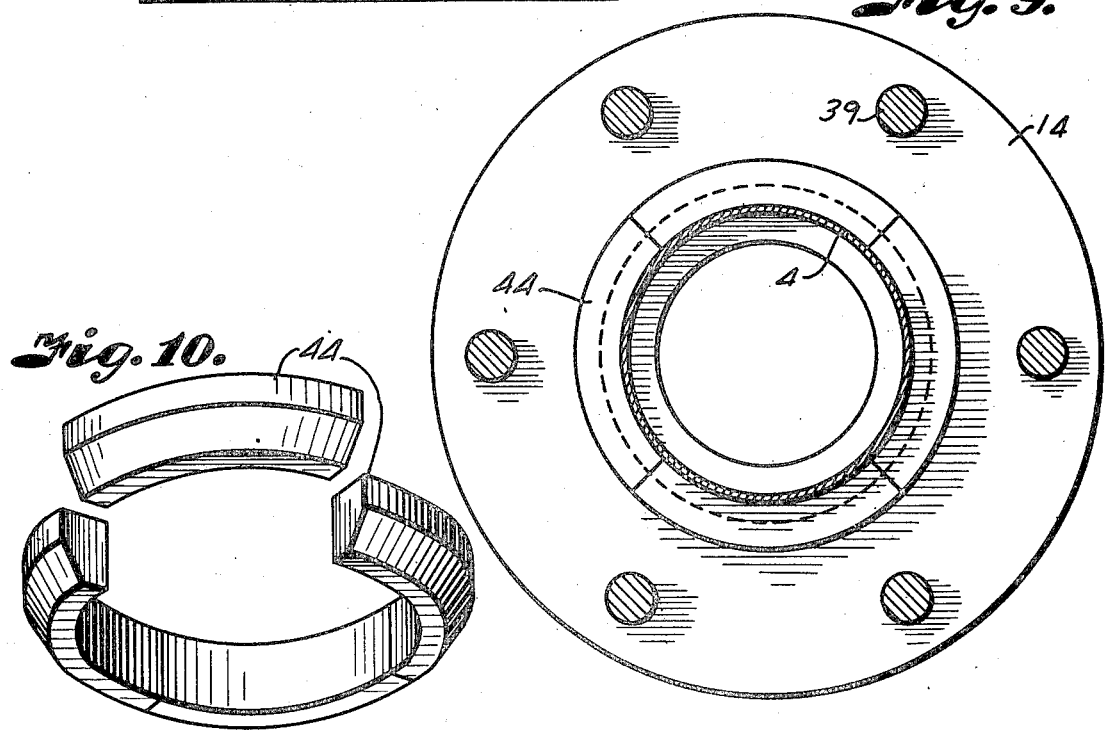
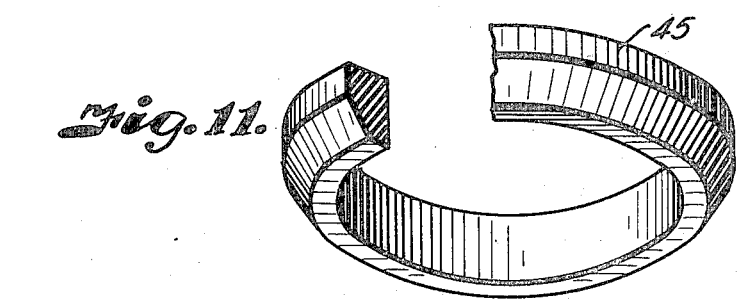

UNITED STATES PATENT OFFICE 2,309,856

SAFETY DEVICE FOR PRESSURE VESSELS AND THE LIKE

Walden W. Mason, Kansas City, Mo.

Application March 11, 1940, Serial No. 323,204

9 Claims. (Cl. 220—39)

This invention relates to safety devices commonly known as safety heads, which are used in the protection of pressure vessels and various equipment wherein dangerous pressures may occur. Such devices include a dome-shaped frangible diaphragm designed to rupture at a predetermined pressure differential. Usually such diaphragms are anchored in position by drawing an annular flange thereof over a gripping surface by a clamping ring. This method produces a fluid-tight seal about the diaphragm but any deformation of the flange by the clamping members may seriously alter the bursting pressure at which the diaphragm was designed to function.

It is, therefore, a principal object of the present invention to provide a resilient gripping means for securely sealing and anchoring a safety diaphragm without altering its bursting pressure.

Other objects of the invention are to provide for a positive seal about the periphery of the diaphragm with a minimum of applied pressure; and to provide a seat adapted to be snugly engaged by the diaphragm flange and pressed into sealing contact therewith by means of a contractable ring incidental to wedging action applied to the ring by a clamping member.

In accomplishing these and other objects of the invention, as hereinafter pointed out, I have provided improved details of structure, the preferred forms of which are illustrated in the accompanying drawings, wherein:

Fig. 1 is a perspective view of a safety device embodying the features of the present invention, a part of the clamping member being broken away to better illustrate the construction.

Fig. 2 is a horizontal section on the line 2—2 of Fig. 3.

Fig. 3 is a vertical central section through the device.

Fig. 4 is a detail perspective view of the contractable ring.

Fig. 5 is a central vertical section through a safety device equipped with a modified form of ring.

Fig. 6 is a horizontal section on the line 6—6 of Fig. 5.

Fig. 7 is a detail perspective view of the form of wedge ring shown in Figs. 5 and 6.

Fig. 8 is a central vertical section through a safety device showing a further modified form of wedge ring.

Fig. 9 is a horizontal section on the line 9—9 of Fig. 8.

Fig. 10 is a perspective view of the form of wedge ring shown in Figs. 8 and 9.

Fig. 11 is a perspective view of a further form of wedge ring, part of which is broken away to better illustrate cross-sectional shape thereof.

Referring more in detail to the drawings, and first to the form of the invention shown in Figs. 1 to 4 inclusive:

1 designates a safety device including a pair of clamping members 2 and 3 for anchoring a frangible diaphragm 4 over a flow passage 5 that may be provided in a pressure vessel or the like 6 wherein dangerous pressures may occur, the flow passage 5 being of ample capacity to provide full relief of the vessel.

The diaphragm 4 is of the type illustrated in Patent No. 1,930,960, issued to Gwynne Raymond on October 17, 1933, and includes a dome-shaped body 7 terminating in an annular flange 8 provided with a rim 9 that is rolled outwardly and retractively from the inner seating face 10 of the flange. In the illustrated instance the flange portion is cylindrical with respect to the axis of the dome portion and is formed therewith so that there are no defined bends to alter the bursting pressure of the diaphragm. The diaphragm is preformed of a relatively light weight, preferably non-corrosive, non-sparkable and ductile sheet metal that may be readily drawn into the dome shape without placing the metal under internal tension which would ordinarily affect the predetermined blow-out pressure. The diaphragm may be constructed to disrupt at a predetermined pressure for any diameter of dome by providing metal of the proper thickness, the tensile strength of the metal being considered.

The clamping member 2 supports and seats the diaphragm and includes a collar-like body 11 having a flow passage 12 therethrough substantially corresponding in capacity to that of the opening 5. The body 11 may be secured to the vessel in any suitable manner, for example by the welding as illustrated at 13, Fig. 3. Extending circumferentially of the body 11 is a lateral flange 14 having a flat upper face 15 in which is formed an annular groove 16 arranged coaxially with the flow passageway 12 and spaced therefrom to form a collar-like wall 17 having an outer cylindrical surface 18 adapted to snugly engage the inner surface of the diaphragm flange when the flange is sleeved thereover as shown in Fig. 3. The base 19 of the groove is of sufficient width to accommodate the rim 9 and the outer face diverges or tapers outwardly to form an annular wedging surface 20.

Engaging within the groove is a wedge ring 21, best illustrated in Fig. 4. The wedge ring 21 has an inner diameter so that it passes freely over the outer surface of the diaphragm flange without scoring or otherwise deforming the diaphragm. The inner face 22 of the ring is preferably of cylindrical form corresponding to the cylindrical shape of the seating face 18, and the outer, annular face 23 substantially conforms to the size of the groove at the surface 15 of the flange 14. The ring also includes a bevelled, annular face 24 to cooperate with the wedging face 20 of the groove to effect contraction of the ring about the flange of the diaphragm when the upper clamping member is drawn toward the lower clamping member as later described. The lower face of the ring is preferably flat as indicated at 25 to accommodate the rolled rim of the diaphragm. The opposite end face 26 of the ring is also of flat form to be engaged by the clamping member 3. In order to render the ring freely contractable and enhance the resiliency thereof, it is provided with a plurality of radial slots 27 and 28, opening inwardly from the end faces 25 and 26 respectively with the slots 27 being staggered with respect to the slots 28 and with the base portions 29 and 30 of the slots overlapping as clearly shown in Fig. 4. The slots thus render the ring completely flexible and adapted to be readily contracted by relatively slight pressure acting on the upper end face of the ring.

The upper clamping member also includes a collar-like body 31, having a flow opening 32 arranged to form a continuation of the flow opening 12 and which has an enlarged counterbore 33 to accommodate the dome portion of the diaphragm. The clamping member also includes an annular flange 34 corresponding to the flange 14 and which has a flat face 35 adapted to seat on the wedge ring. The interior of the flow passage above the counterbore may be threaded as at 36 to receive a pipe or the like if desired.

The flanges 14 and 34 are provided with registering openings 37 and 38 to pass fastening devices such as bolts 39 having heads 40 engaging the under face of the flange 14 and nuts 41 engaging the corresponding face of the flange 34 to draw the clamping members together and cause the wedge ring to be contracted tightly about the diaphragm flange responsive to wedging action of the faces 24 and 20. The clamping ring thus exerts a pressure on the outer surface of the flange to press the flange into sealing contact with the cylindrical face 18 and to retain the diaphragm in position under normal working pressures carried in the vessel. Contact of the wedging ring with the rolled rim of the diaphragm further enhances security of the diaphragm without producing deformation tending to alter the calculated bursting pressures for which the diaphragm was designed. Before hazardous differentials occur on the respective sides of the diaphragm, the diaphragm gives way at substantially the calculated pressure to give relief of the vessel.

The diaphragm and clamping members shown in Figs. 5 and 6 are identical with the corresponding members just described, but the ring, while being of the same exterior shape as the wedge ring above described, does not have the radial slots. In this form of ring, resiliency is effected by providing the ring with an annular slot 42 to provide a resilient tongue 43 arranged to press against the flange of the diaphragm when the ring is wedged into the groove of the clamping member 2.

The clamping ring shown in Figs. 8 and 9 is of solid form but is composed of a series of arcuate sections 44 having the same cross-sectional contour as the rings previously described and which are adapted to be contracted about the flange of the diaphragm by the clamping action exerted upon drawing up of the clamping members by means of the bolts.

The clamping ring 45 shown in Fig. 11 is of solid form and composed of a resilient or readily deformable material adapted to be pressed within the wedge groove and distorted in shape so as to exert gripping pressure upon the diaphragm flange.

From the foregoing it is obvious that I have provided a safety device wherein the diaphragm is securely anchored in sealing engagement without producing scores or deformation of the diaphragm that would ordinarily alter the bursting pressure for which the diaphragm was designed.

It is also obvious that the resilient character of the wedge rings produces the desired clamping action of the ring against the diaphragm flange with relatively little pressure between the clamping members. Thus when the diaphragm is in position it may be depended upon to disrupt within calculated pressures for which it was designed.

What I claim and desire to secure by Letters Patent is:

1. A device of the character described including a diaphragm supporting member having an annular diaphragm seat, a diaphragm engaging said seat, a ring encircling the portion of the diaphragm engaging the seat and having radial slots in opposite faces of the ring to provide for contraction of the ring, and wedge means for contracting the ring about said portion.

2. A device of the character described including a diaphragm supporting member having a substantially cylindrical diaphragm engaging portion, a dome-shaped diaphragm having a cylindrical flange sleeved over said diaphragm engaging portion of the supporting member, a ring encircling said flange and having a plurality of grooves to allow for contraction of the ring, and means for contracting the ring about said flange to retain the flange in gripping engagement with the supporting member.

3. A safety device including, a diaphragm supporting member having a flow opening therethrough and provided with a seat encircling the flow opening, a frangible diaphragm having a circumferential rim portion engaging said seat, contractable means encircling the rim portion of the diaphragm and having portions spaced from each other, said contractable means and supporting member having interengaging faces one movable relative to the other and having shape to effect moving of said spaced portions toward each other when a clamping pressure is applied to said contractable means, and clamping means engaged with the supporting member and said contractable means to effect said pressure and cause gripping engagement of the contractable means with said rim of the diaphragm.

4. A safety device including, a diaphragm supporting member having a flow opening therethrough and provided with a groove encircling the opening, the inner side of said groove forming an annular seat and the outer side a downwardly and inwardly tapering face, a frangible diaphragm having a rim portion sleeved over said seat, a contractable ring encircling said rim portion of the diaphragm and having a bevelled face engaging the tapered face of said groove, and clamping means engaged with the supporting member and with said ring to draw the ring into said groove with the bevelled face thereof sliding on said tapered face to contract the ring into gripping engagement with said rim of the diaphragm and the rim into gripping engagement with said seat.

5. A safety device including, a diaphragm supporting member having a flow opening therethrough and provided with a groove encircling the opening, the inner side of said groove forming a substantially cylindrical seat and the outer side a downwardly and inwardly tapering face, a frangible diaphragm having a substantially cylindrical rim portion sleeved over said seat, a contractable ring encircling said cylindrical rim portion of the diaphragm and having a bevelled face engaging the tapered face of said groove, and clamping means engaged with the supporting member and with said ring to draw the ring into said groove with the bevelled face thereof sliding on said tapered face to contract the ring into gripping engagement with said rim of the diaphragm and the rim into gripping engagement with said seat.

6. A safety device including, a diaphragm supporting member having a flow opening therethrough and provided with a groove encircling the opening, the inner side of said groove forming a substantially cylindrical seat and the outer side a downwardly and inwardly tapered face, a frangible diaphragm having a cylindrical rim portion sleeved over said seat, a contractable ring encircling said cylindrical rim portion and having a bevelled face engaging the tapered face of said groove, said ring having slots in the bevelled portion thereof to enhance contractability of the ring, and clamping means engaged with the supporting member and with said ring to draw the ring into said groove with the bevelled face thereof sliding on said tapered face to contract the ring into gripping engagement with said rim of the diaphragm and the rim into gripping engagement with said seat.

7. A safety device including, a diaphragm supporting member having a flow opening therethrough and provided with a groove encircling the opening, the inner side of said groove forming a substantially cylindrical seat and the outer side a downwardly and inwardly tapered face, a frangible diaphragm having a cylindrical rim portion sleeved over said seat, a contractable ring encircling said cylindrical rim portion and having a bevelled face engaging the tapered face of said groove, said ring having radial slots extending through said bevelled portion and having oppositely directed slots staggered with respect to the first named slots for enhancing contractability of the ring, and clamping means engaged with the supporting member and with said ring to draw the ring into said groove with the bevelled face thereof sliding on said tapered face to contract the ring into gripping engagement with said rim of the diaphragm and the rim into gripping engagement with said seat.

8. A safety device including, a diaphragm supporting member having a flow opening therethrough and provided with a groove encircling the opening, the inner side of said groove forming an annular seat and the outer side a downwardly and inwardly tapering face, a frangible diaphragm having a rim portion sleeved over said seat, a contractable ring encircling said rim portion of the diaphragm and having a bevelled face engaging the tapered face of said groove, said ring having an annular groove between said bevelled face and a portion of the ring immediately encircling said rim portion to provide a resilient tongue adapted to grip the rim portion of the diaphragm, and clamping means engaged with the supporting member and with said ring to draw the ring into the groove with the bevelled face thereof sliding on said tapered face to move said tongue into gripping engagement with said rim portion of the diaphragm and the rim portion into gripping engagement with said seat.

9. A safety device including, a diaphragm supporting member having a flow opening therethrough and provided with a groove encircling the flow opening, the inner side of said groove forming an annular seat and the outer side a downwardly and inwardly tapering face, a frangible diaphragm having a circumferential ring portion engaging said seat, contractable means encircling the rim portion of the diaphragm and having portions spaced from each other, said contractable means comprising a plurality of segments having ends spaced apart and having bevelled faces engaging the tapered face of said groove, and clamping means engaged with the supporting member and with said segments to draw the segments into said groove with the bevelled faces thereof sliding on the tapered face to move said segments into gripping engagement with said rim portion of the diaphragm and the rim portion of the diaphragm into gripping engagement with said seat.

WALDEN W. MASON.